United States Patent [19]

Sakuraba et al.

[11] Patent Number: 5,032,748
[45] Date of Patent: Jul. 16, 1991

[54] SUPERCONDUCTING DC MACHINE

[75] Inventors: Junji Sakuraba, Yokohama; Hiroyuki Mori, Zushi, both of Japan

[73] Assignee: Sumitomo Heavy Industries, Ltd., Tokyo, Japan

[21] Appl. No.: 430,028

[22] Filed: Nov. 1, 1989

[30] Foreign Application Priority Data

Nov. 11, 1988 [JP] Japan .................................. 63-283803

[51] Int. Cl.$^5$ ............................................. H02K 9/00
[52] U.S. Cl. ..................................... 310/52; 310/54; 310/61; 310/90; 310/178; 310/184; 310/198; 310/248; 310/219; 322/28; 388/803
[58] Field of Search .................... 310/10, 68 A-68 C, 310/40 R, 219, 52, 177, 68 R, 178, 248, 102 A, 54, 261, 265, 90, 195, 251, 252, 61, 180, 184, 198; 62/51.1; 322/48, 20, 27, 28; 388/801, 803, 808

[56] References Cited

U.S. PATENT DOCUMENTS

| | | | |
|---|---|---|---|
| 3,242,418 | 3/1966 | Mela | 310/40 R |
| 3,382,387 | 5/1968 | Marshall | 310/219 |
| 3,521,091 | 7/1970 | Halas | 310/40 R |
| 3,590,295 | 6/1971 | Appleton | 310/178 |
| 3,816,780 | 6/1974 | Smith, Jr. | 310/52 |
| 4,058,746 | 11/1977 | Mole | 310/52 |
| 4,443,726 | 4/1984 | Ikegami | 310/248 |
| 4,583,014 | 4/1986 | Murphy, Sr. | 310/52 |
| 4,710,660 | 12/1987 | McKee | 310/178 |

FOREIGN PATENT DOCUMENTS

| | | | |
|---|---|---|---|
| 1908937 | 9/1970 | Fed. Rep. of Germany | 310/178 |
| 2409796 | 9/1974 | Fed. Rep. of Germany | 310/178 |
| 2107937 | 5/1983 | United Kingdom | 310/178 |

OTHER PUBLICATIONS

"Large Superconducting DC Motor Drives" by A. D. Appleton et al, Int. Research & Development Co: Ltd, Newcastle upon Tyne, NE 62YD, IEEE Conf. Publ. No. 170, pp. 163-170, (no month 1978).
"Shaped Field Superconductive DC Ship Drive Systems", Doyle, Advanced in Cryogenic Engineering, vol. 19, 1974, pp. 162-170.
"Superconducting Machinery for Naval Ship Propulsion", Stevens et al, IEEE Transactions on Magnetics, vol. MAG-13, No. 1, Jan. 1977, pp. 269-274.
"A Superconducting Field Winding Subsystem for A 3000 HP Homopolar Motor", Ackermann et al, IEEE Transactions on Magnetics, vol. MAG-13, No. 1, Jan. 1977, pp. 772-775.
"The Circular Form of the Linear Superconducting Machine for Marine Propulsion", Rakels et al, IEEE Transactions on Magnetics, vol. MAG-17, No. 1, Jan. 1981, pp. 127-129.
"A Navy First: Marine Electric Drive System Utilizes Superconductors", Sea Technology, May, 1981, pp. 31-33.
"A Navy First", MTS Journal, vol. 15, No. 1, (no month), 1981, pp. 52-54.
"Further Studies of a Low-Melting Point Alloy Used in a Liquid Metal Current Collector", Maribo et al, IEEE Transactions on Components, Hybrids, and Man-

(List continued on next page.)

Primary Examiner—R. A. Skudy
Attorney, Agent, or Firm—Armstrong, Nikaido, Marmelstein, Kubovcik & Murray

[57] ABSTRACT

A superconducting DC machine includes a superconductive field winding housed in a cryostat. A magnetic shield is arranged outside the cryostat. An armature drum is rotatably supported between the cryostat and the magnetic shield. The armature drum of the machine is divided into a plurality of segments along the length thereof, and has arranged thereon current-collecting brushes not more than one half of the segments. Each brush is electrically connected to the opposed one at the other longitudinal end of the same segment of the armature drum and also to the one at the longitudinal opposed end of an adjacent segment in diagonal fashion progressively.

16 Claims, 9 Drawing Sheets

OTHER PUBLICATIONS ufacturing Technology, vol. CHMT-10, No. 3, Sep. 1987, pp. 452-455.

"Superconducting D.C. Machines: A 1 MW Propulsion System;—Studies for Commercial Ship Propulsion", Appleton et al, IEEE Transactions on Magnetics, vol. MAG-13, No. 1, Jan., 1977, pp. 767-769.

"Industrial Applications of Superconductivity", Electrical Review, vol. 208, No. 24, Jun. 26, 1981, pp. 32-34.

"Developments of Engineering Applications of Superconductivity at IRD", Appleton, Cryogenics, Sep. 1982, pp. 435-438.

"Design and Manufacturing of a Large Superconducting Homopolar Motor (and Status of Superconducting A.C. Generator)", Appleton, IEEE Transactions on Magnetics, vol. MAG-19, No. 3, May 1983, pp. 1047-1050.

"U.K. Ministry of Defence Current Collection Progamme for Superconducting Homopolar Motors", Bartram et al, WEAR 78 (no month), 1982, pp. 201-206.

"A 50 kW Homopolar Motor with Superconducting Field Windings", Arkkio et al, IEEE Transactions on Magnetics, vol. MAG-17, No. 1, Jan., 1981, pp. 900-903.

"Two Liquid Metal Current Collectors for Superconductive Field Acyclic Motors", Arkkio, ICECIO, (no month), 1984, pp. 805-808.

SUPERCONDUCTING DC MACHINE

BACKGROUND OF THE INVENTION

The present invention relates to a DC machine such as a DC homopolar motor using the magnetic field generated by a superconductive coil, or more in particular to a superconducting DC machine having a high electrical efficiency with the armature voltage increased for a reduced current value.

Conventional DC homopolar motors, not utilizing superconductivity, use an iron core for intensifying magnetic fluxes and a multiplicity of current-collecting brushes arranged longitudinally of the armature. This has increased both the weight and volume of the DC machine as a whole. The flux density of the magnetic field generated from the field coil by the use of an iron core gap has its own limitation. The resulting requirement for using a low voltage and a large DC current causes a large electrical loss and a low efficiency.

In an effort to overcome this shortcoming, the introduction of a motor using superconductivity has been considered. The operation of a motor under superconductive state, however, essentially requires a low voltage and a large current, thus making it necessary to take a large current load into consideration. In other words, protective means such as a cooling system is required to cope with the large Joule heating by a large current.

SUMMARY OF THE INVENTION

The object of the present invention is to provide a superconducting DC machine, in which the armature voltage is increased and the current value decreased with a comparatively simple construction, the inconvenient operating conditions of a motor under superconductive state is improved, the contact voltage drop is reduced, and the whole machine construction is made compact while at the same time improving the construction of a cooling maintenance system required for maintaining the superconductive state.

According to one aspect of the present invention, there is provided a superconducting DC machine, in which the armature is divided into a plurality of segments in the longitudinal direction thereof, and current-collecting brushes, half as many as the segments, are arranged along the inner periphery of a magnetic shield in sliding contact with the ends of the segments making up the armature. The current-collecting brushes at the ends of the segments are electrically connected to each other alternately from one brush to another on adjacent segments in sequential fashion. The armature current is applied to the ends of the connections thereby to increase the applied voltage while minimizing the total current flowing in the armature.

According to another aspect of the configuration of the present invention, a superconducting DC machine a superconductive field coil in the form of a solenoid split in two parts along the longitudinal direction of the armature drum, so that magnetic fluxes are allowed to pass through only one point of the armature thereby to reduce the number of the current-collecting brushes along longitudinal direction of the armature drum.

According to still another aspect of the present invention, a superconducting DC machine a cryostat having sealed therein a primary refrigerant for pool-cooling the superconductive coil and a secondary refrigerant for cooling the primary refrigerant, and also has built therein a refrigeration source for the secondary refrigerant.

According to a further aspect of the present invention, a superconducting DC machine in which the superconductive field coil and the primary refrigerant for cooling the same are encased in double heat shield plates.

According to a still further aspect of the present invention, a superconducting DC machine is provided in which the superconductive field winding has built therein a power lead wire and a persistent current switch for connecting an external replaceable excitation power supply intended for operation under a superconductive state.

According to a still further aspect of the present invention, a superconducting DC machine is provided in which the sliding part of the current-collecting brush is made of carbon fiber plated with silver and other parts plated with aluminum.

Figure 3A:
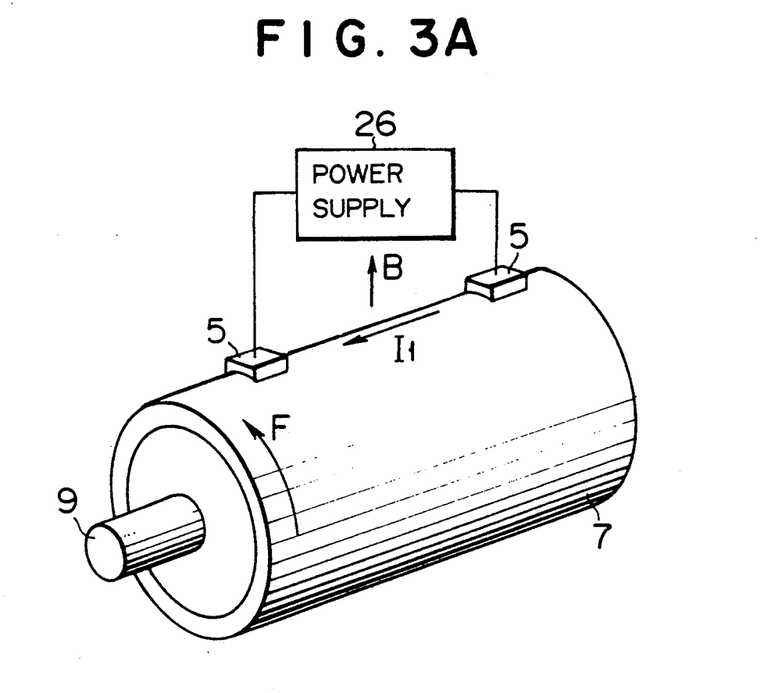
FIGS. 3A and 3B are diagrams showing the principle of operation of armature drum and an equivalent circuit model ordinary armature drum respectively.
Figure 3B:
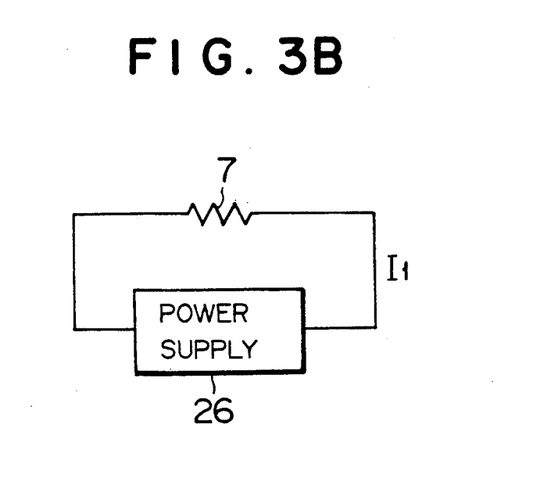

The operation of a superconducting DC machine according to the present invention will be explained with reference to the accompanying drawings. As shown in FIGS. 3A and 3B, in a superconducting DC motor, the magnetic field B produced by the superconductive field winding and the current I supplied from an armature power supply 26 to an armature drum 7 through brushes 5 in the direction crossing the magnetic field combine to generate a torque of F ($=I \times B$). This torque F exerted on the armature drum 7 rotates the armature drum 7.

Specifically, the magnetic field B generated by the superconductive field winding being constant, the torque of F ($=I_1 \times B$) is generated in a normal armature drum 7 which is not segmented.

Figure 4A:
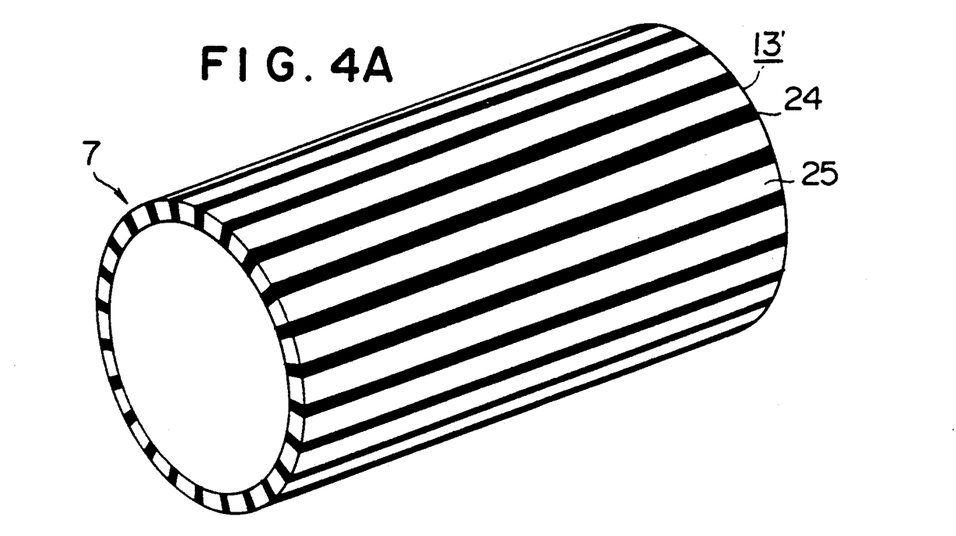
FIGS. 4A, 4B and 4C are diagrams showing a general configuration of a segmented armature drum making up a feature of the present invention, a schematic diagram of an electrical connection of current-collecting brushes in sliding contact with the armature drum to supply power to the latter, and a model of an equivalent circuit obtained from the present concept, respectively.

A configuration of the armature drum 7 providing a feature of the present invention is shown schematically in FIG. 4A. As shown in FIG. 4A, assume that the armature drum 7 includes a plurality of segment electrodes 25 electrically insulated in the longitudinal direction thereof, and that current-collecting brushes $5_{1,3,5,7}$ at the longitudinal ends of the segment electrodes 25 are electrically connected to brushes $5_{2,4,6,8}$ on sequentially adjacent segment electrodes 25 as shown illustratively in FIG. 4B. Connection of $5_8$-13-$5_7$-$5_6$-13-$5_5$-$5_4$-13-$5_3$-$5_2$-13-$5_1$ is established through brush sliding surfaces 13. As compared with the circuit model of FIG. 3B, a number n of resistors having a resistance equal to total resistance of a number n of segments is thus connected in series to a power supply.

As a result, where the armature drum 7 is divided into a number n of segments, the relationship of $F=nI_2 \times B$ holds. If the same output is to be produced as the conventional armature drum shown in FIGS. 3A and 3B, therefore, the relationship $I_1=nI_2$, that is, $I_2=I_1/n$ is required to be satisfied. A current is thus saved for a segmented armature drum. Although the conventional DC motors generally generate a large Joule heat with the decrease in voltage and increase in current, a high-voltage, low-current operation is made possible for a segmented armature drum according to the present invention in which segments are connected in series through brushes and the voltage is thus divided by the segments.

This construction, as compared with the conventional armature drum which is not segmented, permits an applied voltage to be increased several times and also the motor output P defined by $P=I \cdot V$ to be increased.

The current flowing in the armature drum 7 is minimized, thereby reducing Joule heat loss.

DESCRIPTION OF THE PREFERRED EMBODIMENTS

An embodiment of the present invention will be explained below.

Figure 1:
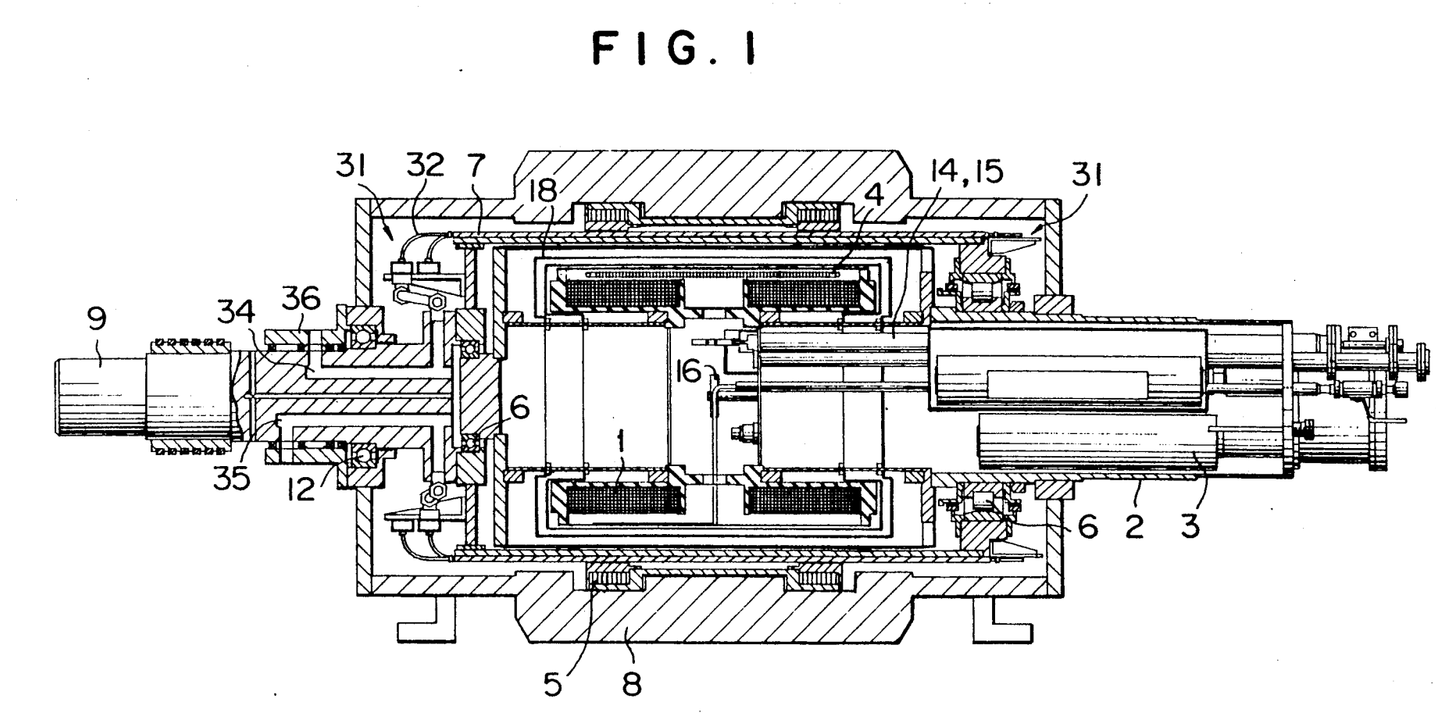
FIG. 1 is a sectional view showing a construction of a superconducting motor according an embodiment of the present invention.
Figure 2:
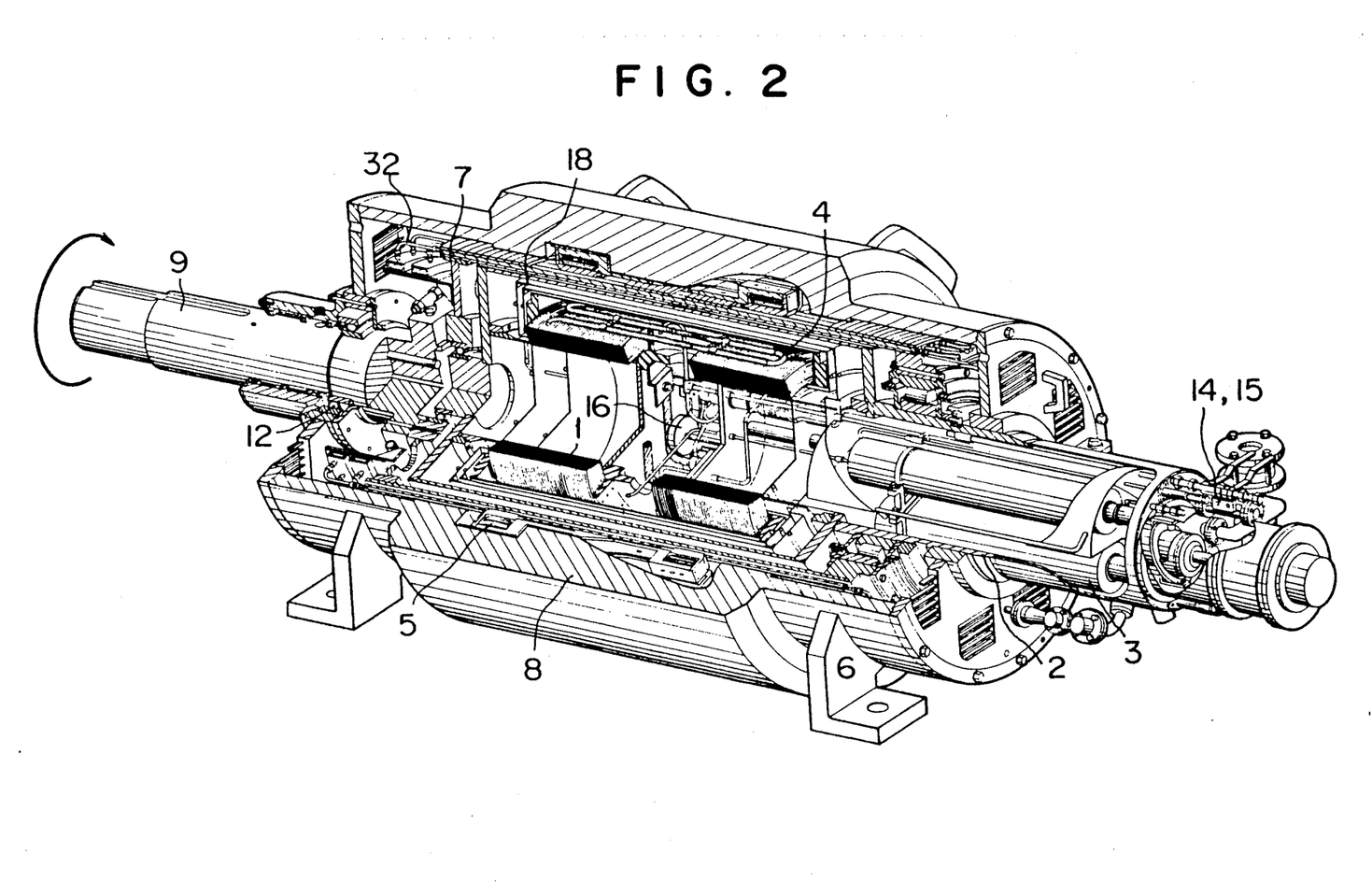
FIG. 2 is a perspective view of the construction shown in FIG. 1.

A sectional view and a perspective view of an embodiment of the present invention is shown in FIGS. 1 and 2 respectively. A superconductive field winding 1 for generating a predetermined magnetic field is a split-type solenoid divided into two parts along the direction of a motor shaft 9. This superconductive field winding 1 is pool-cooled in liquid helium providing a primary refrigerant, which in turn is cooled by a liquid helium re-condenser 4. The liquid helium re-condenser 4 is cooled by the cooling helium providing the secondary refrigerant supplied from an expansion engine 3 and isolated from the primary refrigerant.

Figure 5:
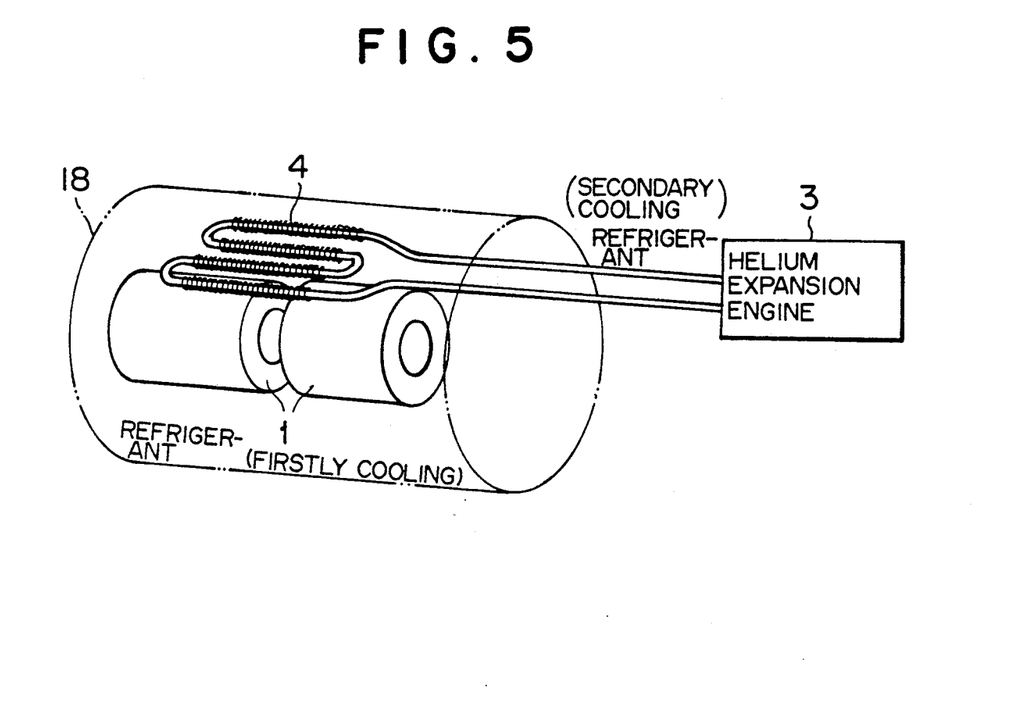
FIG. 5 is a diagram schematically showing a configuration of the primary and secondary cooling systems of a superconductive magnetic winding.

The superconductive field winding 1, the liquid helium re-condenser 4 and the helium expansion engine 3 are housed in a cryostat 2. The cooling system of this embodiment, as the features of the configuration thereof are shown in FIG. 5, is thus separated into the liquid helium providing the primary refrigerant for directly pool-cooling the superconductive field winding 1 and the liquid helium making up the secondary refrigerant for cooling the liquid helium of the primary refrigerant through the liquid helium re-condenser 4. Should the liquid helium of the secondary refrigerant be mixed with foreign matter or impurities from the helium expansion engine, therefore, the primary refrigerant is not adversely affected.

Figure 6:
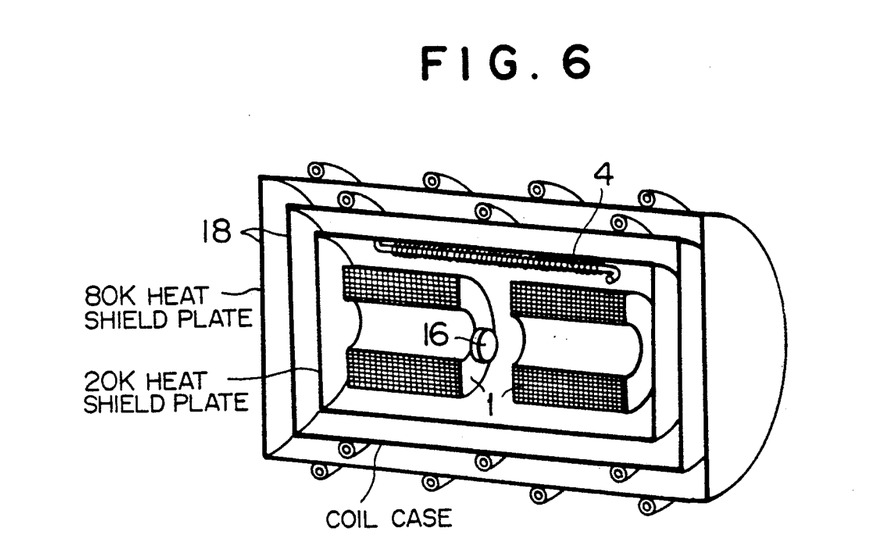
FIG. 6 is a diagram schematically showing a double thermal shield construction.
Figure 7A:
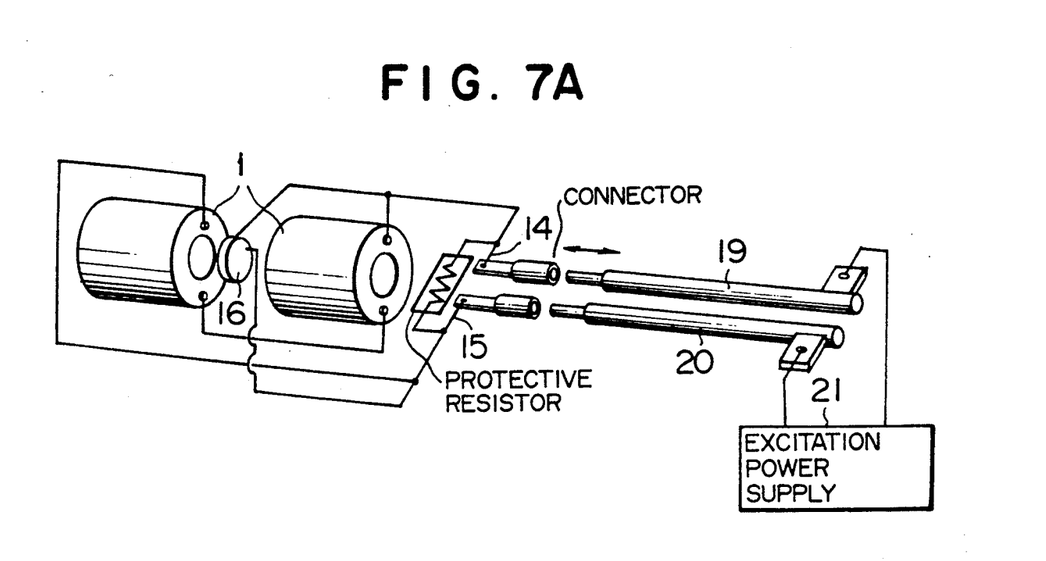
FIGS. 7A and 7B are schematic diagrams showing a configuration of replaceable current leads and a persistent current switch of a superconductive field winding and a circuit connection thereof, respectively.
Figure 7B:
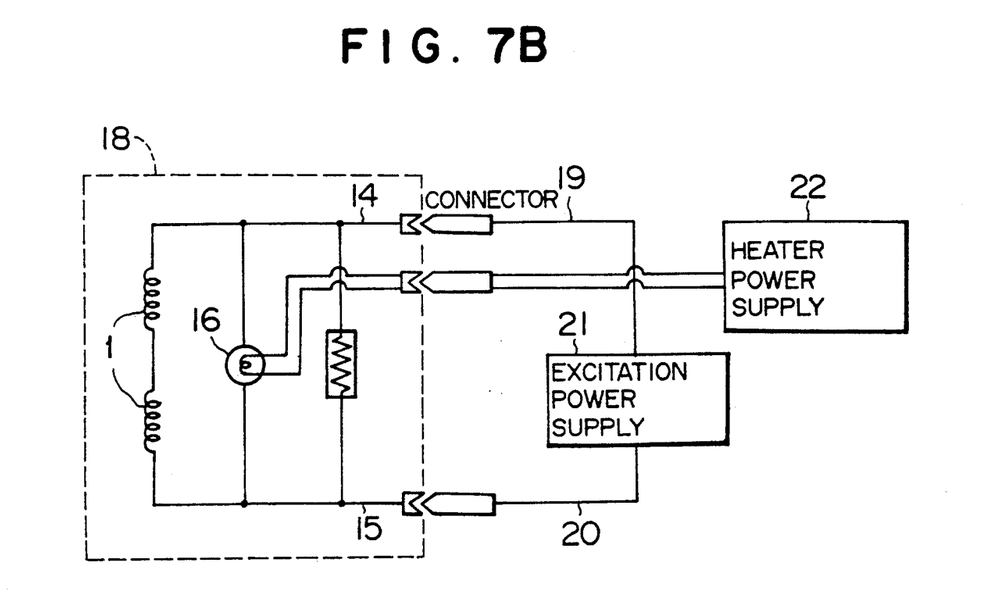
Figure 8A:
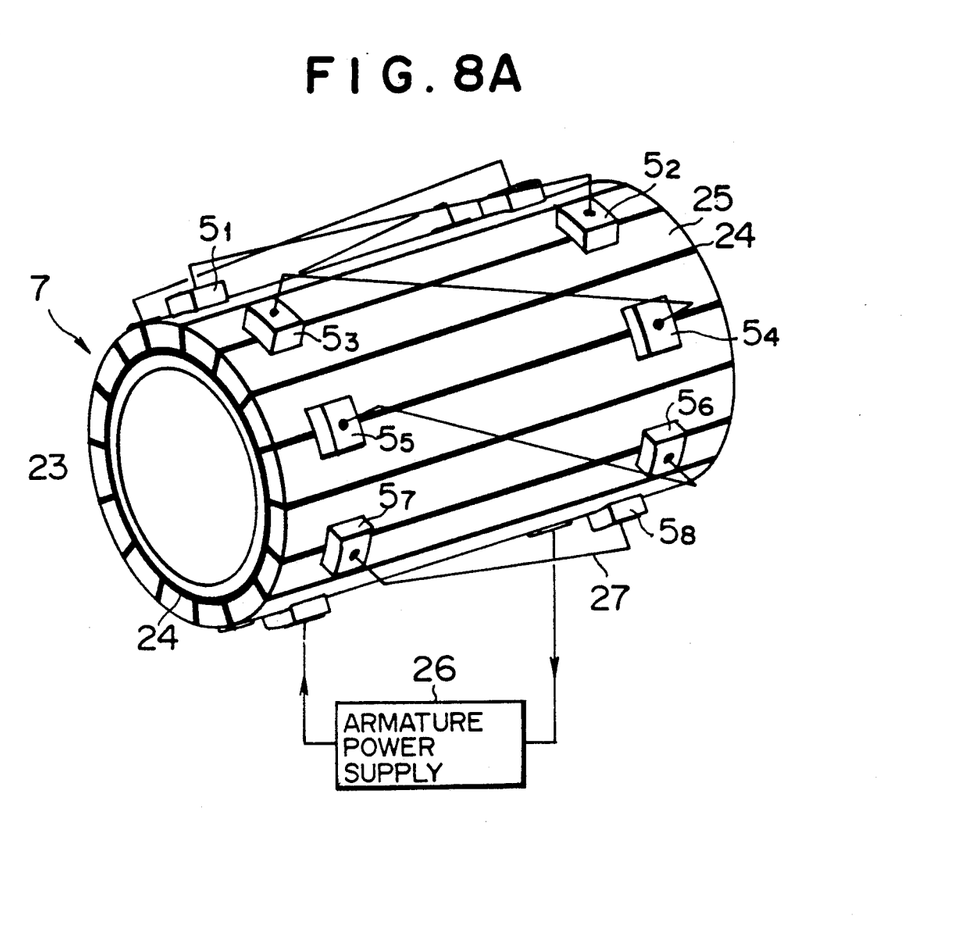
FIGS. 8A and 8B are schematic diagrams showing an arrangement and a configuration of a segmented armature drum providing one of the features of the present invention and current-collecting brushes in sliding contact with the armature drum, respectively.
Figure 8B:
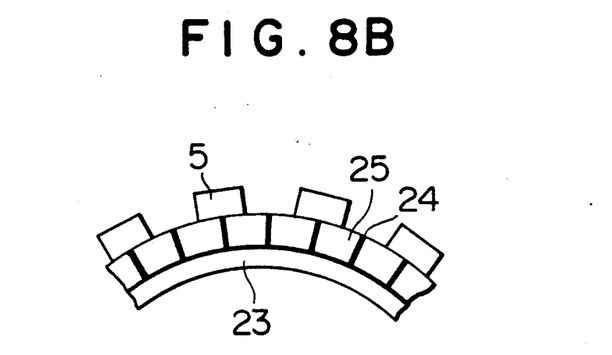

The superconductive field winding 1 and the liquid helium providing the primary refrigerant in which the winding 1 is dipped, are housed in double heat shield plates 18 and are so configured as to reduce the heat penetration into the liquid helium of the primary refrigerant as shown in a partial configuration of FIG. 6. A persistent current switch 16 and current leads 14, 15 energized under superconductive operation are arranged in the cryostat 2. One end of the current leads 14, 15 extends outside of the cryostat 2 permitting the replaceability of the current leads 19, 20 for supplying an excitation current from an appropriate excitation power supply 21 as shown in FIGS. 7A and 7B. In operation, as described later in detail, as a procedure for starting the operation, the replaceable current leads 19 and 20 are temporarily inserted into the connectors at the ends of the current leads 14, 15 exposed outside of the cryostat 2, and after thus supplying the excitation current from the excitation power supply 21 to the superconductive field winding 1, the replaceable current leads 19, 20 are pulled in order to continue the operation.

A magnetic shield yoke 8 is arranged outside the cryostat 2 configured as described above and has the functions of forming a magnetic shield, generating a magnetic field and supporting the torque reaction on the outermost periphery of the superconducting motor.

Figure 4B:
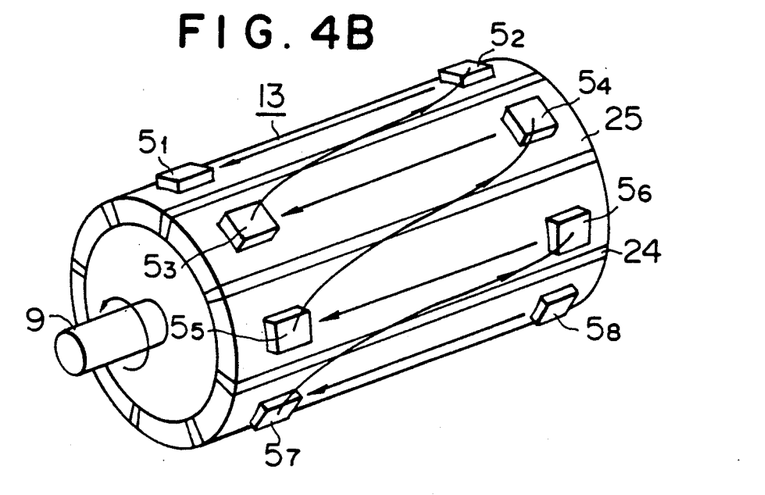
Figure 4C:
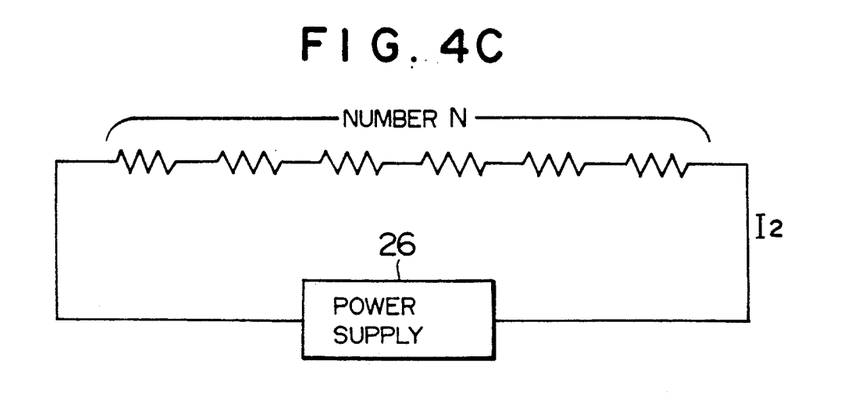

An armature drum 7 coupled integrally with the motor shaft 9 is arranged in the space between the magnetic shield yoke 8 and the cryostat 2. The armature drum 7 is rotatably supported by bearings 6 between the magnetic shield yoke 8 and the cryostat 2. The motor shaft 9 is held by the bearing 12 on the magnetic shield yoke 8. These bearings 6, 12, which are all non-magnetic in character, are made of non-conductive ceramics materials such as alumina or zirconia. The use of these bearings reduces the bearing loss including the Joule heat loss caused by friction heat and induction current due to magnetization. Construction features of the armature drum 7 will be explained with reference to FIGS. 1 and 2 and FIGS. 8A and 8B showing the features extracted therefrom. The armature drum 7 includes a plurality of segment conductors 25 electrically insulated from each other through insulating members 24 and arranged on a cylindrical torque tube 24 integrally connected to the motor shaft 9. The armature drum 7 thus constructed has current-collecting brushes 5 arranged at the ends thereof on the inner peripheral surface of the magnetic, shield yoke 8. These current-collecting brushes 5, of a number n, have the same width as the segment conductors 25. A number of sets n/2 or n/3 of the brushes 5 are arranged at each longitudinal, end of the armature drum 7. Of the n/2 or n/3 sets of current-collecting brushes 5, the brushes $5_{2,4,6,8}$ mounted at a longitudinal end of the armature drum 7 are connected with those of the collecting brushes $5_{1,8,5,7}$ transversely displaced by one segment conductor respectively at the other end of the armature drum 7, by armature-fixed conductors 27, thus establishing connected pairs $5_2$-$5_1$, $5_4$-$5_3$, $5_6$-$5_5$, $5_8$-$5_7$. The current-collecting brushes 5 in the number of n/2 or n/3 sets arranged along the inner periphery of the magnetic shield yoke 8 at the longitudinal ends of the armature drum 7 are electrically connected sequentially in a diagonal direction from one segment to another. One of the pairs of the electrical connections is connected to an armature power supply 26. These electrical connections permit the applied voltage from the armature power supply 26 to be applied between segment conductors by way of the collecting brushes 5 in sliding contact with the longitudinal ends of the armature drum 7. The voltage is applied to the next line of segment conductors 25 thereby to form a current path alternated between the brushes longitudinally of the armature drum 7 as illustrated in FIG. 4B. Should the number n of the segment conductors 25 be equal to that of the current-collecting brushes 5, if the collecting brushes 5 are positioned on the insulating portions between the segment conductors 25, the segment conductors 25 insulated from each other by being divided into a plurality of portions are liable to be short-circuited into an equivalent configuration shown in FIG. 3A.

This is the reason why in the embodiment under consideration the current-collecting brushes 5 in the number of n/2 or n/3, as compared with the number n of the segment conductors 25, are arranged in opposed relationship at the ends of the armature drum 7 and equidistantly along the periphery of the armature drum 7 in sliding contact therewith. As a result of this configuration involving a number n of segment conductors 25, the actual number of the current-collecting brushes 25 arranged to form a current path is n/2 or n/3. Under any conditions of rotation of the armature drum 7, all the segment conductors 25 on the armature drum 7 are not shortcircuited, but a current path is secured always by a number n/2 or n/3 of segment conductors 25, thereby generating a stable rotational torque.

Figure 9A:
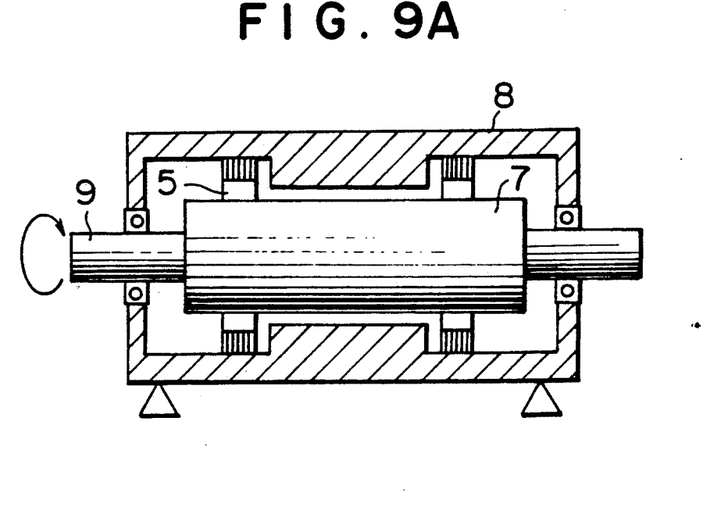
FIGS. 9A, 9B and 9C are schematic diagrams showing an arrangement of a magnetic shield yoke, an armature drum and current-collecting brushes interposed therebetween, a configuration of a conductor secured on the armature for connecting the current-collecting brushes, and a construction of the current-collecting brushes, respectively.
Figure 9B:
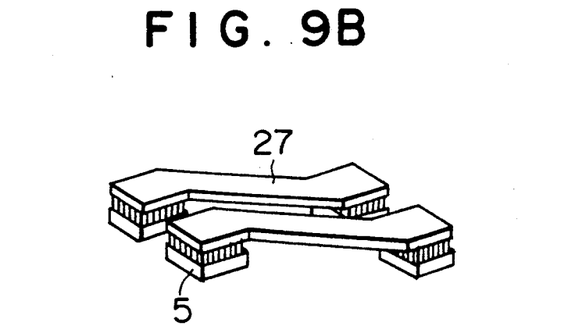
Figure 9C:
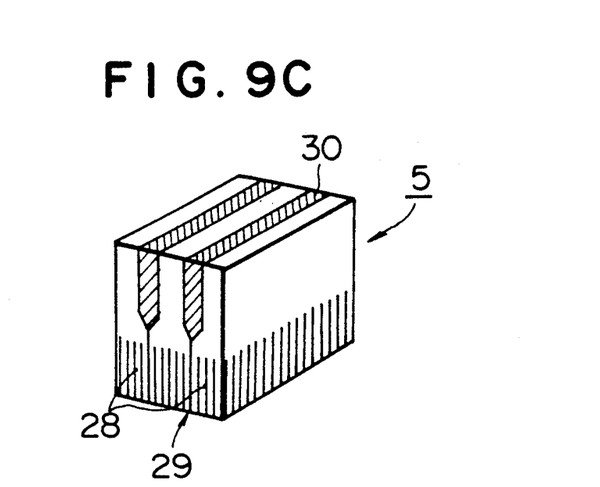

These current-collecting brushes 5, as shown schematically in FIG. 9A, are arranged on the inner periphery of the magnetic shield yoke 8, and connected to each other by armature-fixed conductors 27 extending diagonally of the armature drum 7 as shown in FIG. 9B. The current-collecting brush 5 used in this embodiment, as shown in FIG. 9C, has a silver-plated portion 29 in sliding contact with the armature drum 7, an aluminum-plated portion 28 of a carbon fiber sandwiched by copper plates 30 and formed in hot press. The use of the brush with a silver-plated sliding surface reduces the drop in contact voltage on the one hand, and the aluminum plating decreases the variation width of the voltage drop on the other hand, thus minimizing the motor loss.

Figure 10A:
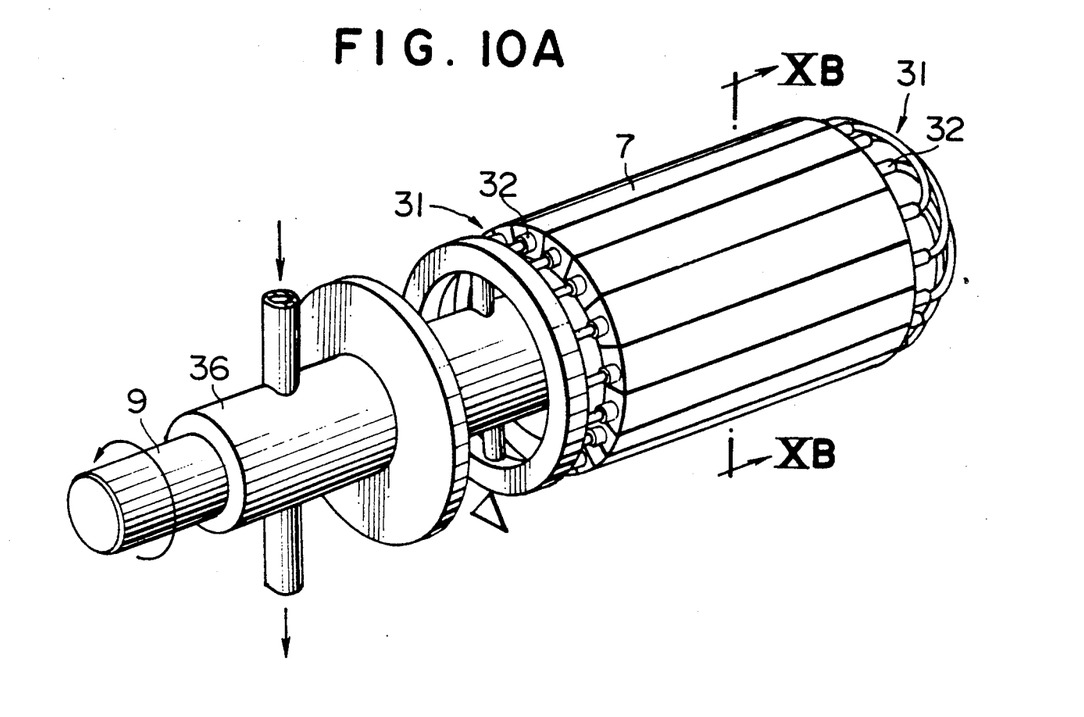
FIGS. 10A and 10B are diagrams schematically showing a configuration of a water-cooling construction of an armature drum.
Figure 10B:
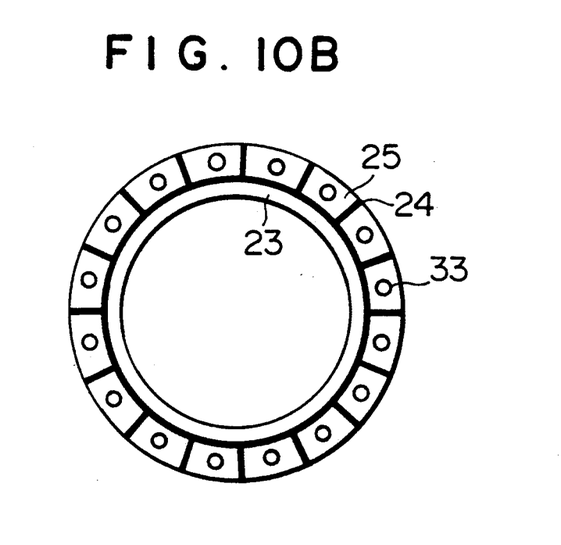

The water-cooling system of the armature drum 7 will be explained with reference to FIGS. 10A and 10B schematically showing extracted portions of FIGS. 1 and 2. The motor according to this embodiment includes a water-cooling system for removing Joule heat generated from the segment conductors 25 and the contact voltage drop of the brushes 5. This water-cooling system has a plurality of cooling water paths 33 inserted longitudinally in each of the segment conductors 25 of the armature drum 7. Cooling water headers 31 are provided at the longitudinal ends of the armature drum 7. The cooling water header 31 on the side far from the motor shaft 9 has a plurality of cooling pipes 32 for connecting the cooling water paths 33 alternately. Each predetermined pair of the cooling water paths 33 in the segment conductors 25 are thus coupled into U shape by the cooling pipes 32, thus forming a cooling water path alternating within the segment conductors 27. The cooling water header 31 on the side rear to the motor shaft 9 includes a plurality of cooling pipes 32 for connecting a water pipe 34 and a drain pipe 35 formed through the motor shaft 9, to the ends of the cooling water paths connected in U shape as mentioned above. The water pipe 34 formed in the motor shaft 9 is supplied with water from an annular water supply-drain attachment 36 covering the motor shaft 9.

The cooling water is drained from the water drain pipe 35 of the motor shaft 9 through the water supply-drain attachment 36. In the water-cooling system thus constructed, the water pipe 34 in the motor shaft 9 is supplied with the cooling water through the water supply-drain attachment 36 from a predetermined external water source. The cooling water is introduced to the cooling water path 33 in the segment conductors 25 from the cooling pipes 32 through the cooling water header 31. The cooling water thus introduced into the cooling water paths 33 is re-introduced into the cooling water path 33 in another segment conductor 25 by way of the cooling pipes on the cooling water header 31 on the side far from the armature drum 7, and through the cooling pipes 32 of the cooling water header 31 on the side of the motor shaft 9, is drained out of the motor through the water drain pipe in the motor shaft 9 and the water supply-drain attachment 36. This construction permits the cooling water to be recirculated in the cooling water paths of the segment conductors 25 of the armature drum 7 thereby to cool the armature drum 7. According to the present embodiment, a generally-used water cooling system of a circulation type is desirably connected, and pure water should be used as the cooling water for preventing dielectric breakdown. A water-cooling system of this construction, as compared with the air-cooling system using a blower, is high in cooling efficiency and realizes a cooling system for the armature drum 7 having a small noises.

The sequence of operation of a superconducting motor in a superconductive mode will now be explained.

In the configuration shown in FIGS. 7A and 7B, the superconductive field winding 1 and the persistent current switch 16 are connected in parallel, and are connectable to an external excitation power supply 21 through removable current leads 19, 20 fittable in the current leads 14, 15. In operating the motor, the pure water starts to be recirculated by the above-mentioned water-cooling system, while the removable current leads 19, 20 are connected to the current leads 14, 15. The persistent current switch 16 includes a superconductive wire and a thermal switch, and so functions that a current is supplied from a heater power supply 22 to a heater wire through a connector the same as excitation power supply 21, and the superconductive wire is kept higher than the critical temperature thereby realizing a normal conductive state. As a result, a resistance is generated in the persistent current switch 16, and as viewed from the superconductive field winding 1 of zero resistance held in the superconductive state, this switch 16 is set in the same condition as if it were cut off. In this way, with the persistent current switch 16 turned off, a current is supplied from the external excitation power supply 21 to the superconductive field winding 1.

Under the state where a current is supplied up to a predetermined value, the persistent current switch 16 is turned on. The operation of turning on the persistent current switch 16 is explained below.

If the current application to the heater wire in the persistent current switch 16 is cut off, the persistent current switch 16, which is pool-cooled in liquid helium, switches to a superconductive state, and is thus turned on. Under this condition, the current supplied to the external excitation power supply 21 is decreased progressively. The current that has thus far been flowing to the superconductive field winding 1 branches into the persistent current switch 16, so that at the point in time when the current from the excitation power supply 21 becomes zero, a permanent current flows between the superconductive coil 1 and the persistent current switch 16.

Subsequently, the removable current leads 19, 20 are separated from the current leads 14, 15 that have thus far been fixed within the cryostat 2. The aforementioned operation completes the excitation of the superconductive field winding 1 under a permanent current state, and an intense magnetic field is generated in the core of the superconducting motor, thus driving the same motor.

In the foregoing description of embodiments of the present invention, a superconducting DC machine has been explained as a superconducting motor. The present invention, however, is not limited to a superconducting motor, but may be applicable also to a superconducting generator with equal effect. A superconducting motor and a superconducting generator according to the embodiments of the invention may be combined as an electrical propulsion machine for marine applications.

We claim:

1. A superconducting DC machine comprising:
    a cryostat, said cryostat has sealed therein a primary refrigerant and a secondary refrigerant for cooling the primary refrigerant, said cryostat further having built therein a source of said secondary refrigerant;
    a superconductive field winding housed in said cryostat, said superconductive field winding is a split-type solenoid divided into halves in a longitudinal direction of an armature drum, said superconductive field winding being pool-cooled by said primary refrigerant;
    a magnetic shield arranged outside the cryostat;
    an armature drum supported rotatably between the cryostat and the magnetic shield, said armature drum being divided into a plurality of segments extending longitudinally thereof; and
    a plurality of current-collecting brushes arranged on an inner periphery of the magnetic shield in opposed relationship with ends of the armature drum, a number of pairs of said brushes is not more than half of the number of segments of the armature drum and electrically connected to each other longitudinally of the armature drum, each brush being diagonally connected to another at an opposed end of an adjacent segment.

2. A superconducting DC machine according to claim 1, wherein said superconductive field winding and said primary refrigerant for cooling the superconductive field winding are housed in double there shield plates.

3. A superconducting DC machine according to claim 1, wherein said plurality of current-collecting brushes are arranged in contact with the armature drum on the inner periphery of the magnetic shield, said brushes being made of carbon fiber having a sliding portion plated with silver and the remaining portion plated with aluminum.

4. A superconducting DC machine according to claim 1, further comprising a ceramic bearing used as a support between said magnetic shield and said armature drum.

5. A superconducting DC machine according to claim 1, wherein said superconducting DC machine is a superconducting motor.

6. A superconducting DC machine according to claim 1, wherein said superconducting Dc machine is a superconducting generator.

7. A superconducting DC machine comprising:
    a cryostat;
    a superconductive field winding housed in said cryostat, said superconductive field winding includes at least a lead and a persistent current switch for supplying an external current from an external excitation power supply, said superconductive field winding being excited and driven in a persistent mode;
    a magnetic shield arranged outside the cryostat;
    an armature drum supported rotatably between the cryostat and the magnetic shield, said armature drum being divided into a plurality of segments extending longitudinally thereof; and
    a plurality of current-collecting brushes arranged on an inner periphery of the magnetic shield in opposed relationship with ends of the armature drum, a number of pairs of said brushes is not more than half of the number of segments of the armature drum and electrically connected to each other longitudinally of the armature drum, each brush being diagonally connected to another at an opposed end of an adjacent segment.

8. A superconducting DC machine according to claim 7, wherein said superconductive field winding is a split-type solenoid divided into halves in a longitudinal direction of an armature drum.

9. A superconducting DC machine according to claim 7, wherein said plurality of current-collecting brushes are arranged in contact with the armature drum on the inner periphery of the magnetic shield, said brushes being made of carbon fiber having a sliding portion plated with silver and the remaining portion plated with aluminum.

10. A superconducting DC machine according to claim 7, further comprising a ceramic bearing used as a support between said magnetic shield and said armature drum.

11. A superconducting DC machine according to claim 7, wherein said superconducting DC machine is a superconducting motor.

12. A superconducting Dc machine comprising:
    a cryostat;
    a superconductive field winding housed in said cryostat;
    a magnetic shield arranged outside the cryostat;
    an armature drum supported rotatably between the cryostat and the magnetic shield, said armature drum being divided into a plurality of segments extending longitudinally thereof, said armature drum includes a plurality of cooling pipes inserted in a plurality of segment conductors longitudinally of the armature drum and a couple of cooling water headers for supplying the cooling water to and draining the same from the cooling pipes; and a plurality of current-collecting brushes arranged on an inner periphery of the magnetic shield in opposed relationship with ends of the armature drum, a number of pairs of said brushes is not more than half of the number of segments of the armature drum and electrically connected to each other longitudinally of the armature drum, each brush being diagonally connected to another at an opposed end of an adjacent segment.

13. A superconducting DC machine according to claim 12, wherein said superconductive field winding is a split-type solenoid divided into halves in a longitudinal direction of an armature drum.

14. A superconducting DC machine according to claim 12, wherein said plurality of current-collecting brushes are arranged in contact with the armature drum on the inner periphery of the magnetic shield, said brushes being made of carbon fiber having a sliding portion plated with silver and the remaining portion plated with aluminum.

15. A superconducting DC machine according to claim 12, further comprising a ceramic bearing used as a support between said magnetic shield and said armature drum.

16. A superconducting DC machine according to claim 12, wherein said superconducting DC machine is a superconducting motor.

* * * * *